US008554620B1

(12) United States Patent
O'Keeffe (10) Patent No.: US 8,554,620 B1
(45) Date of Patent: Oct. 8, 2013

(54) HIGH VOLUME CALL ADVERTISING SYSTEM AND METHOD

(76) Inventor: Sean P. O'Keeffe, Valencia, CA (US)

( * ) Notice: Subject to any disclaimer, the term of this patent is extended or adjusted under 35 U.S.C. 154(b) by 0 days.

(21) Appl. No.: 13/353,244

(22) Filed: Jan. 18, 2012

Related U.S. Application Data (63) Continuation of application No. 11/347,970, filed on Feb. 6, 2006, now Pat. No. 8,107,600.

(60) Provisional application No. 60/650,773, filed on Feb. 7, 2005.

(51) Int. Cl.
*G06Q 30/00* (2012.01)

(52) U.S. Cl.
USPC ..... 705/14.4; 709/223; 379/88.22; 379/90.01

(58) Field of Classification Search
USPC ................ 705/14, 14.4; 709/223; 379/88.22, 379/93.12, 90.01
See application file for complete search history.

(56) References Cited

U.S. PATENT DOCUMENTS

| | | | |
|---|---|---|---|
| 2,831,927 A | 4/1958 | McCarty | |
| 3,478,168 A | 11/1969 | Bryant, Jr. | |
| 3,632,880 A | 1/1972 | Goldschein | |
| 3,668,326 A | 6/1972 | Bryant, Jr. | |
| 3,767,864 A | 10/1973 | Smith | |
| 3,876,840 A | 4/1975 | Bryant, Jr. | |
| 3,889,291 A | 6/1975 | Walker | |
| 4,468,528 A | 8/1984 | Reece | |
| 4,766,542 A | 8/1988 | Pilarczyk | |
| 5,375,161 A | 12/1994 | Fuller | |
| 5,515,421 A | 5/1996 | Sikand | |
| 5,559,868 A | 9/1996 | Blonder | |
| 5,642,407 A | 6/1997 | He | |
| 5,724,407 A | 3/1998 | Bruno et al. | |
| 5,748,190 A | 5/1998 | Kjorsvik | |
| 5,751,791 A | 5/1998 | Chen et al. | |
| 5,778,053 A | 7/1998 | Skarbo et al. | |
| 5,796,945 A | 8/1998 | Tarabella | |
| 5,870,461 A | 2/1999 | Hanenfield | |
| 5,907,604 A | 5/1999 | Hsu | |
| 5,920,616 A | 7/1999 | Hazenfield | |

(Continued)

FOREIGN PATENT DOCUMENTS

| | | |
|---|---|---|
| EP | 446129 | 9/1991 |
| FR | 2713425 | 6/1995 |

(Continued)

OTHER PUBLICATIONS

Email correspondence between Sean O'Keeffe and Susie Wells on Feb. 1, 2006.

(Continued)

*Primary Examiner* — Gerald Gauthier
*Assistant Examiner* — Simon King
(74) *Attorney, Agent, or Firm* — Knobbe Martens Olson & Bear LLP (57) ABSTRACT

Disclosed is a method and system for providing third party advertisements with the use of a delayed call connection system, comprising an answering system configured to play an advertisement message after answering a call to a business; a plurality of advertisers' messages stored in memory and accessible by said answering system, whereby at least one of the advertisers is not related to the business; and a communication system configured to connect the telephone caller to the business after the plurality of advertisers' messages have been played.

5 Claims, 9 Drawing Sheets

(56) References Cited

U.S. PATENT DOCUMENTS

| | | | |
|---|---|---|---|
| 5,946,378 | A | 8/1999 | Farfan |
| 5,948,061 | A | 9/1999 | Merriman et al. |
| 5,999,599 | A | 12/1999 | Shaffer et al. |
| 6,014,439 | A | 1/2000 | Walker |
| 6,084,628 | A | 7/2000 | Sawyer |
| 6,138,162 | A | 10/2000 | Pistriotto et al. |
| 6,173,311 | B1 | 1/2001 | Hassett et al. |
| 6,178,240 | B1 | 1/2001 | Walker |
| 6,192,115 | B1 | 2/2001 | Toy et al. |
| 6,226,367 | B1 | 5/2001 | Smith et al. |
| 6,263,052 | B1 | 7/2001 | Cruze |
| 6,272,211 | B1 | 8/2001 | Hazenfield |
| 6,301,354 | B1 | 10/2001 | Walker |
| 6,460,018 | B1 | 10/2002 | Kasai |
| 6,539,088 | B1 | 3/2003 | Addy |
| 6,542,587 | B1 | 4/2003 | Bryde |
| 6,603,973 | B1 | 8/2003 | Foladare |
| 6,606,652 | B1 | 8/2003 | Cohn et al. |
| 6,614,896 | B1 | 9/2003 | Rao |
| 6,621,514 | B1 | 9/2003 | Hamilton |
| 6,650,761 | B1 | 11/2003 | Rodriguez et al. |
| 6,681,028 | B2 | 1/2004 | Rodriguez et al. |
| 6,683,941 | B2 | 1/2004 | Brown |
| 6,687,352 | B2 | 2/2004 | Hazenfield |
| 6,694,012 | B1 | 2/2004 | Posthuma |
| 6,704,411 | B1 | 3/2004 | Nishidate |
| 6,714,634 | B1 | 3/2004 | Breeden |
| 6,751,306 | B2 | 6/2004 | Himmel |
| 6,757,533 | B2 | 6/2004 | Lampela et al. |
| 6,807,558 | B1 | 10/2004 | Hassett et al. |
| 6,856,673 | B1 | 2/2005 | Banks et al. |
| 6,975,856 | B2 | 12/2005 | Ogasawara |
| 7,006,613 | B2 | 2/2006 | Novak et al. |
| 7,142,230 | B2 | 11/2006 | Novak et al. |
| 7,142,846 | B1 | 11/2006 | Henderson |
| 7,174,163 | B2 | 2/2007 | Aksu et al. |
| 7,177,627 | B2 | 2/2007 | Melaku et al. |
| 7,251,318 | B1 | 7/2007 | Henderson |
| 7,349,668 | B2 | 3/2008 | Ilan et al. |
| 7,440,563 | B2 | 10/2008 | Baiz Matuk |
| 2002/0176559 | A1 | 11/2002 | Adamek et al. |
| 2002/0184088 | A1* | 12/2002 | Rosenberg ............... 705/14 |
| 2003/0101462 | A1 | 5/2003 | Chung |
| 2003/0208754 | A1 | 11/2003 | Sridhar et al. |
| 2004/0024647 | A1 | 2/2004 | Chung |
| 2004/0097198 | A1 | 5/2004 | Chen |
| 2004/0128192 | A1 | 7/2004 | Paluszek |
| 2004/0190687 | A1 | 9/2004 | Baker |
| 2004/0223597 | A1 | 11/2004 | Morton |
| 2004/0247093 | A1 | 12/2004 | Potts |
| 2005/0177379 | A1 | 8/2005 | Gaik |
| 2005/0198207 | A1 | 9/2005 | Hoblit |
| 2005/0256875 | A1 | 11/2005 | Rietschel |
| 2006/0041474 | A1 | 2/2006 | Westling et al. |
| 2006/0092966 | A1* | 5/2006 | Sitnik et al. ............. 370/463 |
| 2007/0162296 | A1 | 7/2007 | Altberg et al. |

FOREIGN PATENT DOCUMENTS

| | | |
|---|---|---|
| JP | 1143545 | 6/1989 |
| JP | 3049349 | 3/1991 |
| JP | 2002/290565 | 10/2002 |
| WO | WO 02096068 | 11/2002 |

OTHER PUBLICATIONS

Dini, Eugene F.; Linkins, Robert, W.; Chaney, Michael, Effectiveness of Computer-Generated Telephone Messages in Increasing Clinic Visits, Archives of Pediatrics and Adolescent Medicine, Aug. 1995, pp. 902-905, vol. 149.

Sharmistha, Sarkar Das; Chan, Norman; Wages, Danny; Hansen, John H.L., Application of Automatic Speech Recognition in Call Classification, Proceedings of the . . . IEEE International Conference on Acoustics—Speech and Signal Processing, 2002, vol. IV, pp. 3896-3899.

Needleman, T., I've Got Friday on My Mind (voicemail system), Accounting Technology, Oct. 1994, vol. 10, No. 9, pp. 75-76.

Telephone answering machines, Direct Line, No. 5, p. 22-6, 1986.

Tell one, tell all (telephone answering machine for charitable organization), Business Systems and Equipment, p. 61, May 1986.

Brent, G., Communications—choosing a telephone answering machine, Office Equipment Index, No. 231, pp. 22-23, Feb. 1986.

Perdue, Robert J.; Rissanen, Eugene L., Conversant 1 Voice System: Architecture and Applications, AT&T Technical Journal, Sep.-Oct. 1986, vol. 5 No. 5, pp. 34-47.

Jewell, L., Telephone answering machines, What Telephone & Communications News, No. 4, pp. 62-65, Aug.-Sep. 1984.

Bergland, G.D.; Kerkeslager, E.R.; Nacon, R.J.; Smith, G.W. Jr., New Custom Calling Services, Colloq Int de Commutation, May 7-11, 1979, vol. 3, pp. 1256-1262, Paris, France.

Jeffries, K.L., Multiline Automatic Message Recording System, IBM Disclosure Bulletin, Mar. 1979, vol. 21 No. 10, pp. 3898-3899, Armonk, NY USA.

Soubigou, A., Voice Mail Services, An Example: Phonex, pp. 147-160, 1979/1980.

Bergland, G.D., et al. New Custom Calling Services, Colloq Int de Commutation, Paris, Fr, May 7-11, 1979.

Hunt, R.E.; Jenkins, W.M.; Whitehead, V.E.; Recorded Voice Announcement System, IBM Technical Disclosure Bulletin, Jul. 1978, vol. 21 No. 2, pp. 438-439, Armonk, NY USA.

Jacobson, S.W., Telephone answering device control circuit, Patent GB 1384805 (Issued: Feb. 19, 1975) (Application: Oct. 24, 1972) Priority Application: US 195400 (Nov. 3, 1971).

English (United States), Jan. 9, 2001, Business Method for Reduced Cost Messaging.

English (United States), Jan. 9, 1982, Busy Call Diverter.

English (United States), Jan. 12, 1982, Prank Call Deterrent Means.

English (United States), Jan. 12, 1982, Unanswered Call Diverter.

English (United States), Jan. 1, 1994, Method for Substituting Message Portions on Answer Machines Depending on the Outgoing Message.

English (United States), Jan. 6, 1993, Method and Apparatus for Caller-Dependant Answer Messages in a Directory-Linked Telephone Network.

English (United States), Jan. 6, 1993, Method for Exposing Personalized Messages to a Caller.

Testdrive: Speechsoft's Topcat, Dec. 1, 1999.

100 Cool Call Center Things, Oct. 5, 2000, Call Center Magazine in celebration of our 100th issue.

LabTest: Rockwell's CT-Media Based Transcend Contract Center, Jun. 1, 2000.

CT Labs Test CT Media: Rockwell Transcend Contact Center for Workgroups v2.0, Sep. 5, 2000.

Patent Search Report sent to Knobbe, Martens, Olson & Bear, LLP on Dec. 29, 2005, (redacted).

* cited by examiner

"EXAMPLE CALL IN AD SYSTEM AND REVENUE PROJECTION & REPORT FORMAT"

| 1 Year 3 Teir Profit Projection | | Low End Per Week Rate | | Medium Per Week Rate | | High End Per Week Rate |
|---|---|---|---|---|---|---|
| Top 10 markets 66 Stations in Top 10 (52 weeks @ rate * 66) | $ $ | 250.00 ~901 858,000.00 ~902 | $ $ | 500.00 1,716,000.00 | $ $ | 1,000.00 ~903 3,432,000.00 ~904 |
| Markets 11-20 56 Stations in 11-20 (52 weeks @ rate * 56) | $ $ | 200.00 582,400.00 | $ $ | 400.00 1,164,800.00 | $ $ | 600.00 1,747,200.00 |
| Markets 21-40 101 Stations in 21-40 (52 weeks @ rate * 101) | $ $ | 100.00 525,200.00 | $ $ | 200.00 1,050,400.00 | $ $ | 300.00 1,575,600.00 |
| Markets 41+ 787 Stations in 41+ (52 weeks @ rate * 787) | $ $ | 50.00 2,046,200.00 | $ $ | 100.00 4,092,400.00 | $ $ | 200.00 8,184,800.00 |
| Total All Markets | $ | 4,011,800.00 ~905 | $ | 8,023,600.00 | $ | 14,939,600.00 |
| 5 Year Projected Total Revenue | $ | 20,059,000.00 ~906 | $ | 40,118,000.00 | $ | 74,698,000.00 |

FIG. 9

HIGH VOLUME CALL ADVERTISING SYSTEM AND METHOD

CROSS-REFERENCE TO RELATED APPLICATIONS

This application is a continuation of U.S. application Ser. No. 11/347,970, filed Feb. 6, 2006, which, according to the USPTO, will issue on Jan. 31, 2012 as U.S. Pat. No. 8,107,600, which claims the benefit of U.S. Provisional Patent Application No. 60/650,773, filed Feb. 7, 2005, both of which are hereby incorporated in their entireties by reference herein.

BACKGROUND

1. Field of the Invention

The present application relates in general to telecommunications and, in particular, to advertising over the telephone.

2. Description of the Related Art

The extensive worldwide telecommunications network permits individuals to instantly and inexpensively communicate with others around the world. By simply picking up a telephone and dialing a number, anyone can connect to speak to another person on the other side of the world. Calls are generally connected via the traditional, wired telephone network, known as the public switched telephone network ("PSTN").

Many companies provide telephone access for the public to reach staff, sales personnel, technical support, enter into contests, automated account access systems, and so on through a call center. A private branch exchange ("PBX") system may, for example, receive each call and immediately distribute the call to the proper extension.

While some companies provide access to the services described above at a subscription fee, many companies provide access to the services at no cost. These companies may receive a high volume of calls due to a large consumer or client base. Consequently, they usually incur significant costs in providing and maintaining the service.

Therefore, in view of the foregoing, it would be advantageous to provide a method and system for reducing or defraying the costs of providing and maintaining such a service.

SUMMARY

The present system and method discloses third party advertising in the context of answering a high volume of calls. A caller first dials a number associated with a business. In one embodiment, the caller is connected to a call center responsible for the call advertisement system. The call advertisement system connects to the caller and plays a third party advertisement from memory. After playing at least one third party advertisement for the caller, the caller is then forwarded to the business he originally intended to call, and the business answers the caller in a normal fashion, in the same way as if the call advertisement system was not involved.

In another embodiment, the call advertisement system is located at a business. A caller first calls the business' telephone number and is connected to the call advertisement system located at the business. The call advertisement system plays a third party advertisement for the caller from memory. After playing at least one third party advertisement for the caller, the caller is then forwarded or otherwise connected to the appropriate extension in a normal fashion.

In yet another embodiment, the call advertisement system is located at a call center but the caller is first connected to the business by calling the business' telephone number. The business connects the call then forwards or otherwise connects the call to the call center. The call advertisement system located at the call center connects to the caller and plays a third party advertisement from memory. After playing at least one third party advertisement for the caller, the caller is then forwarded or otherwise connected back to the business, and the business answers the caller in a normal fashion.

Third party advertisements are stored in any memory storage method or format, such as an electronic database. Third party advertisers may connect to the advertisement memory storage in order to populate the memory with advertisements to be used with the call advertisement system. Third party advertisers may select available businesses to advertise with as well as gain other information on available markets through the call advertisement system. Furthermore, businesses may also engage the call advertisement system to offer the use of their call volume to play third party advertisements. Both third party advertisers and businesses are advantageously benefited by the call advertisement system; the creation of a new product placement opportunity allows third party advertisers additional promotion opportunities and give businesses income from helping create those opportunities.

BRIEF DESCRIPTION OF THE DRAWINGS

These and other features will now be described with reference to the drawings summarized below. These drawings and the associated description are provided to illustrate a preferred embodiment of the invention, and not to limit the scope of the invention.

DESCRIPTION

Exemplary embodiments of a system and method for high volume call advertising are described herein. A call advertisement system is featured which plays third party advertisements for a caller to a business and then connects the caller to that business.

Advertisements for use with the system can originate from and relate to any business. Third party advertisements refer to advertisements by a business that is not the same business called. For example, if a caller intends to call a ticket broker and hears an advertisement for a recording company, then the advertisement from the recording company would be a third party advertisement since it is not an advertisement for the radio station being called.

Additionally, advertisements for use with the call advertisement system can take many forms. An advertisement may be recorded audio content to be played over an audio only connection. An advertisement may also include image, text, video or other data content to be played exclusively or in addition to the audio content of a call. For example, a user who has called a hotel using a display-enabled phone who is first connected to the call advertisement system may first receive audio, text and video content for a restaurant local to that hotel before being connected to that hotel, such as the restaurant's audio jingle, the address and business hours to be displayed on the phone display, and a picture of the restaurant, also shown on the phone display. Although the rest of the embodiments discussed herein refer to audio content advertisements only, the use of image, video and other data content is also contemplated for use by embodiments of the call advertisement system.

The call advertisement system as described in the call center embodiment may be advantageously configured to handle ten or more calls at about the same time. This means that ten or more callers may be receiving an advertisement at the same time. If the same advertisement is being delivered to a group of callers, some callers may hear the advertisement at exactly the same time and others may be hearing different parts of the same advertisement; the time shifting is due to the difference in when the call is received. In other embodiments, the call center call advertisement system may be configured to handle one hundred or more calls at about the same time. In yet further embodiments, the call center call advertisement system may be configured to handle one thousand or more calls at about the same time. In even further embodiments, the call center call advertisement system may be configured to handle ten thousand or more calls at about the same time. In an even further call advertisement system embodiment, the system may be configured to handle forty thousand or more calls at about the same time. In each of the embodiments mentioned, the callers may have called in at slightly different times, such as a fraction of a second or a few seconds apart. In certain embodiments, the system keeps track of the order of calls, such as by using a time stamp, and may serve an appropriate advertisement individually to each caller.

Although the call advertisement system may be configured for use with high call volume, a feature of the call advertisement system as discussed herein is that the system allows for multiple businesses that have low call volume to benefit from a service targeted to high call volume businesses by allowing multiple low call volume businesses to advertise on behalf of the call advertising system. For example, in the call center embodiment discussed below and illustrated in FIG. 1, multiple low call volume businesses can choose to have their calls forwarded to the call center which is capable of handling a high volume of calls. While at the call center, the callers will hear a third party advertisement before being forwarded to the actual telephone number for the appropriate low call volume business. Consequently, by combining their low call volumes, the multiple businesses are able to create a high call volume for use with the call advertisement system. This will permit a group of businesses to collect enough callers such that relatively large advertisers would be interested in placing advertisements with them due to the significant and unique advertisement demographic as well as the exposure offered by this group of businesses.

Callers may advantageously be enticed to call in to the call advertisement system by the offering of incentives. For example, the system might keep track of the order of each caller and award a prize to the caller that matches a random number in the order of callers, or the prize could be given to a numbered caller the system chooses to select, such as the one hundred and fiftieth caller of the day. The system could also be used to play a telephone game. For example, after the advertisement is played the caller may be asked to use his or her phone to answer a question, and if answered correctly the caller would be entered into a drawing for a prize. The system could also be used as a way to enter a lottery by charging the telephone bill or an otherwise known bills system at the end of the advertisement, and using the phone buttons to enter and selecting how many tickets to purchase. The purchase may be made and recorded electronically.

Another feature of the call advertisement system is that it can provide a source of revenue for otherwise "free" services. Third party advertisers who choose to advertise with the call advertisement system will usually pay a fee in order to have their advertisements played. Businesses who play the advertisements may receive a portion of that fee as revenue. That revenue may be used to offset the cost of operating the business. For example, a computer networking business may choose to provide a free technical support line to customers who have purchased networking products made by that business. In order to provide the free technical support line, the business incurs costs which may include the cost of running the technical support call center and salaries to the technical support staff. According to the prior art, the company would usually connect a caller to the first available technical support representative. With the call advertisement system, however, the computer networking business can first have a third party advertisement played to the caller when the caller makes a call to the technical support line, and then connect the caller to a technical support representative. The business may receive revenue for each time the advertisement is played. With the revenue received, the computer networking business can offset the cost of providing the technical support telephone service.

Yet another feature of the call advertising system is that it allows third party advertisers to select which market they would like to advertise to. When a third party advertiser selects an advertisement to be used with the system, the advertiser may be given a list of businesses where his advertisement may be played. Additionally, he may see profiles of callers who typically call those businesses, as discussed below. Consequently, he can select his target audience accordingly. For example, two available businesses advertising for the call advertising system may be a pizza delivery business and a hair salon. A third party advertiser for a national football game may choose to have his advertisement for that game played when a caller calls the pizza delivery business instead of the salon since he expects more callers to a pizza delivery business would be interested in football.

Third party advertisers may advantageously download their advertisements in memory local to the caller for use with the call advertisement system. Advertisements may be stored in memory in many forms, including but not limited to, databases, such as a computer database; electronic memory, such as a hard disk drive or flash memory drive; tapes, such as audio cassette tapes or computer data storage tapes; disks, such as floppy disks, compact discs, digital video discs, or blu-ray discs; and paper. Although the memory storage method used hereinafter is referred to as an advertisement database, any other method could be used to store the advertisements, as discussed above. Alternatively, the third party advertiser could serve the advertisement itself directly to each caller by making the advertisement available to the call advertisement system over a website. Thus, when the call advertisement system has a need for the advertisement, the link to the advertisement provided by the advertiser is accessed and the advertisement is supplied by the designated web server.

Another feature of the call advertisement system allows for the advertisement database to collect information on what telephone numbers have called in and the subscriber information, where available. This information may be used in many different ways. The call advertisement system may advantageously create a profile of a caller who has called several different businesses associated with the call advertisement system or has otherwise provided caller profile data. Caller profile data may include the caller's telephone number, which may identify the geographic location of the caller, the caller's name, if registered with a caller identification service, the time and day of the call, the duration of the call, and so on. For example, if the call advertisement has received three calls from a caller in the 310 area code at 11:23 pm, 1:15 am, and 3:00 am to a steakhouse, young men's clothing store, and a country music station, then the call advertisement system may create a profile of the caller that the caller is a young male from Los Angeles who is usually awake at night, listens to country music and likes steak. Caller profiles may benefit third party advertisers who may attempt to target callers based on the businesses available and associated with the call advertisement system, as discussed above. Caller profiles may be stored in the third party advertisement database or in a separate database for use with the caller advertisement system.

Figure 1:
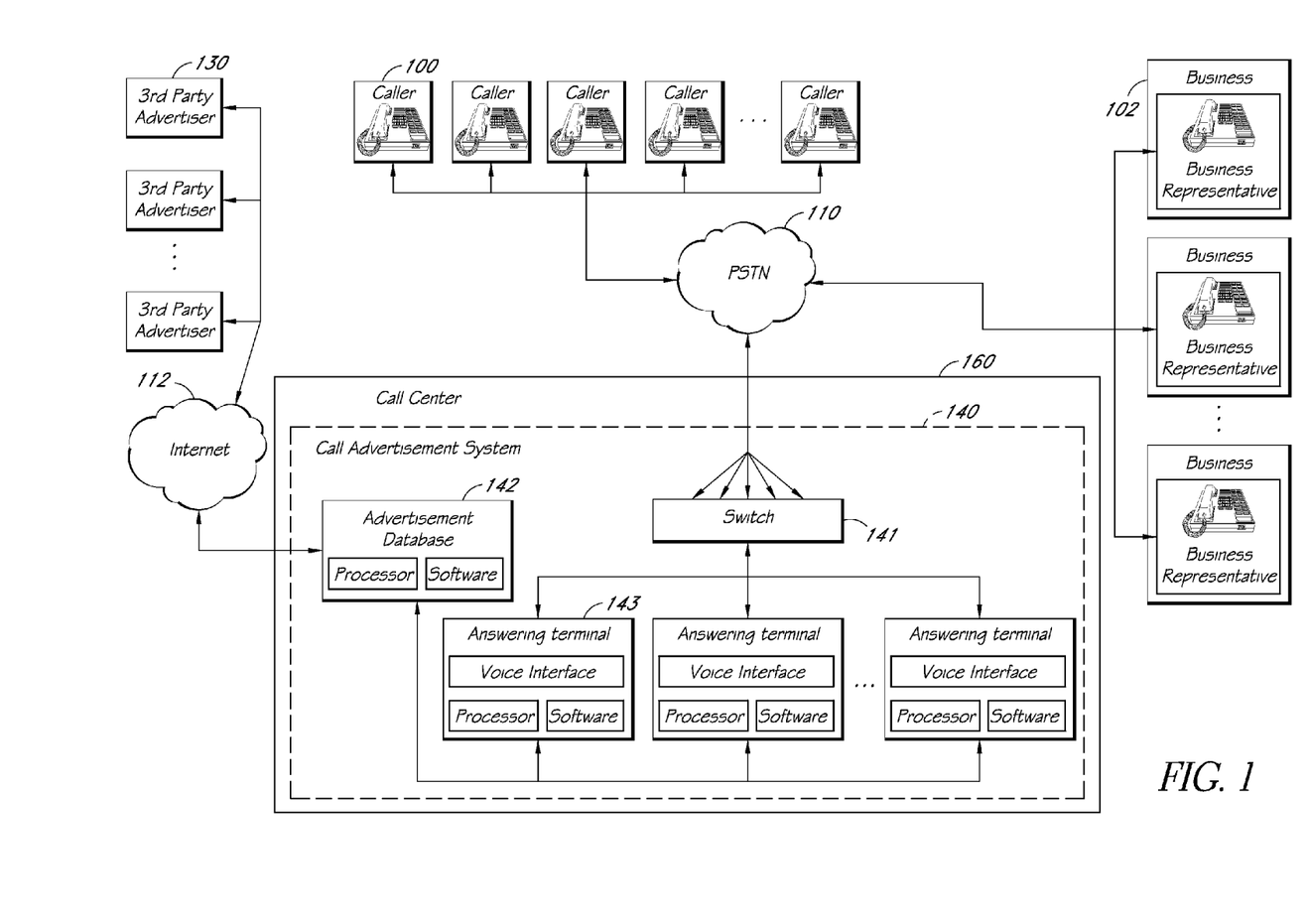
FIG. 1 illustrates a call center embodiment of the invention which uses the PSTN.
Figure 2:
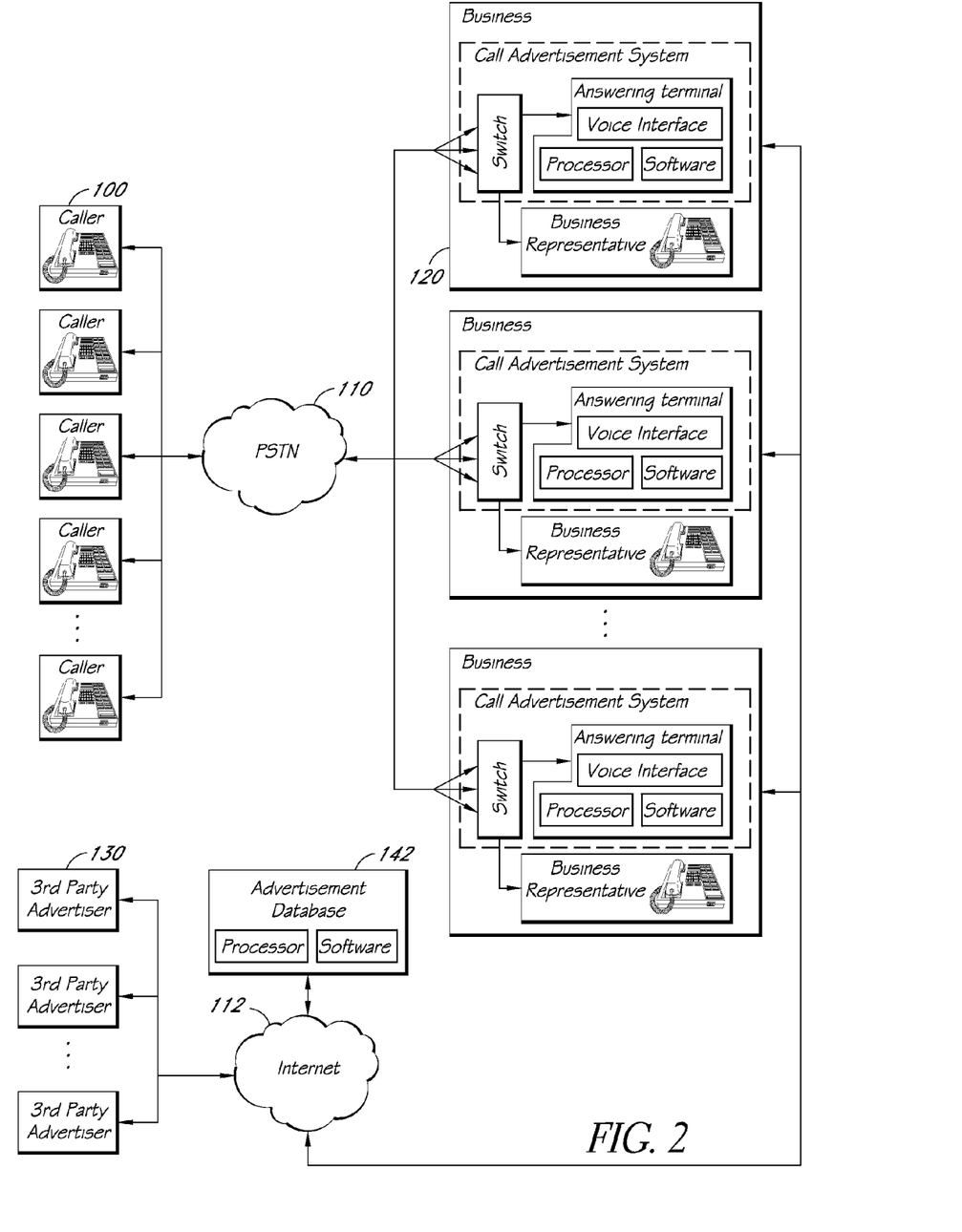
FIG. 2 illustrates a business center embodiment of the invention which uses the PSTN.

A call may be placed to the system by any methods known or contemplated in the art. In certain embodiments, the call may be placed using a standard telephone handset that connects to a telephone network, including a traditional fixed phone "landline", which uses dedicated physical wire connections connected to a single location; wireless and radio telephones, which use either analog or digital radio signals; satellite telephones, which utilize telecommunication satellites; and voice over IP ("VoIP") telephones, which use broadband internet connections. Between end users, the connection may be carried by a number of methods, including fiber optic cable, point to point microwave or satellite relay. The connection may be carried via the PSTN. A sample embodiment of the system using the PSTN is shown in FIGS. 1 and 2 and discussed further below. In yet further embodiments, a call may be placed to the system without the use of the PSTN, such as by an audio connection through a computer connected to the Internet. For example, a caller browsing a web site may be given the option to speak with a representative of a business by clicking on a link, and by clicking on the link the caller is connected to the call advertising system. A sample embodiment of the system that uses the Internet in place of the PSTN is shown in FIG. 3 and discussed further below.

The system may also be contacted by methods known or contemplated in the art. In certain embodiments, a call may locate the system using a telephone number. In other embodiments, the system may be located by a call through the use of an internet protocol ("IP") address, URL, domain name or e-mail address.

Figure 3:
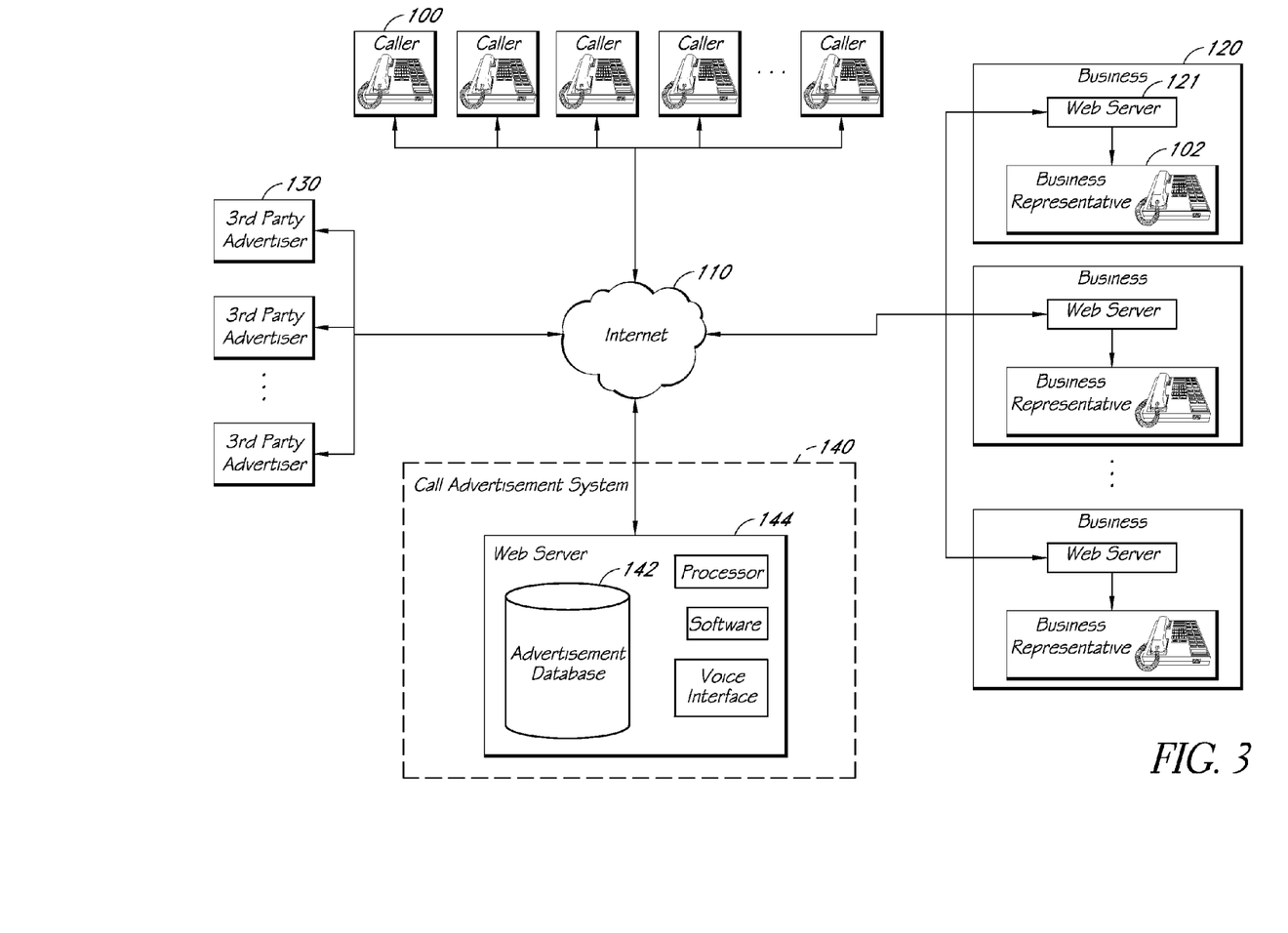
FIG. 3 illustrates a web server embodiment of the invention which uses the Internet instead of the PSTN.

Certain embodiments of the system and method may be implemented in a communications system as illustrated in FIGS. 1 through 3. FIG. 1 illustrates a call center embodiment of the invention which uses the PSTN 110. Although FIG. 1 illustrates one example configuration of a high volume call center, any high volume call center known in the art may be used with the call advertisement system. As illustrated in FIG. 1, a caller 100 may place a call to the call advertising system 140 located at a call center 160 using the PSTN 110. The caller 100 may use the PSTN 110 to call a business 120, which is also connected to the PSTN 110. In certain embodiments of the system, a caller 100 intending to call a business 120 is first connected to the call advertisement system 140 at the call center 130, while in other embodiments the caller is first connected to the business 120. Although the call center is shown separate from the PSTN, in one embodiment it may be incorporated as part of the PSTN system in a telephone switching center of the PSTN.

The call advertisement system 140 according to this embodiment is located at a call center 160 capable of handling a high volume of calls. Other embodiments of the call advertisement system are configured to accept a lower volume of calls and may be located at the business, as shown in the sample embodiment according to FIG. 2. Although with a sufficient investment it is understood that the business could incorporate a very high call volume system as well. Returning to FIG. 1, the call advertisement system 140 comprises a central telephone switching system ("switch") 141 connected to the PSTN. The switch 141 is capable of accepting and directing a high volume of calls. The switch 141 is connected to at least one answering terminal 143. The answering terminal 143 may be an answering system or may be connected to a plurality of answering systems. Many different answering systems may be connected to the answering terminals to be used to answer a call and to play a third party advertisement from the advertisements database. For example, answering machines or computers connected to the answering terminals may be used by the call advertising system. In the sample embodiment shown, the answering terminal 143 is a computer with a processor and software capable of answering a call from the caller 100 and playing a third party advertisement to that caller. Also connected to the answering terminal 143 is a database of third party advertisements 142.

Any system or method known to the prior art may be used to create a memory storage for the advertisements. In the sample embodiment shown in FIG. 1, the memory storage for the third party advertisements takes the form of an electronic database, shown as the advertisements database 142. The advertisement database 142 may transfer the advertisements via a data connection to the answering terminal 143 to be played for a caller 100.

Third party advertisers connect to the advertisement database 142 at the call center 160 using the Internet 112. A third party advertiser 130 may use this connection to populate the advertisement database 142 with advertisements or to update advertisements already in the database. In other embodiments, a third party advertiser 130 may connect to the advertisements database 142 using the PSTN 110, for example, by using a modem to call and connect to a modem at the call center 130, where the modem is connected to the advertisement database 142 (not shown). In yet further embodiments, a third party advertiser 130 may mail third party advertisements to the call advertising system which are then collected and stored in the advertisements database. In an embodiment where the third party advertisements are mailed to the call advertisement system in a written format, then text-to-speech ("TTS") software may be used by the call advertisement system to play the advertisements to the caller. Alternatively, a representative of the call advertisement system may record the audio advertisement based on the written advertisement sent in.

The advertisement database 142 is connected to the Internet 112 and allows for third party advertisers 130 to upload advertisements to the advertisements database 142 or update advertisements already in the advertisements database 142. The advertisement database 142 can also keep track of the number of times an advertisement has been played. Another feature of the advertisement database 142 is that it can allow the third party advertiser 130 to choose which business 120 for which the advertiser would like to have his advertisement played for its callers as well as set other options for the running of his advertisement, such as when during the day it is played, for how long it is played, how many times it should be played, and so on. For example, the advertisement database 142 may display a list of all businesses advertising on behalf of the call advertisement system 140 and allow the third party advertiser 130 to select (via an internet website, for example) the callers to which business or businesses for which the advertiser wants to play the advertisement. The advertisement database 142 may also list certain time slots that that advertisement could be played, such as from 8:00 am to 10:00 am, or 10:00 am to 12:00 pm, and so on. Additionally, the third party advertiser 130 may be able to set a limit on the number of times the advertisement is played, such as when the advertiser 130 has a limited budget to spend on the advertisement and the embodiment of the call advertisement system 140 charges based on the number of times played.

Yet another feature of the advertisement database 142 is that it can inform the third party advertiser 130 via the Internet 112 as to the amount of money due for having the call advertisement system 140 play the third party advertiser's advertisement and automatically have the amount deducted from its account.

After the call advertisement system 140 at the call center 160 completes playing the third party advertisement to the caller 100, the call advertisement system 140 advantageously forwards the caller 100 through the PSTN to the business 120 the caller originally dialed. According to the embodiment shown in FIG. 1, the call is ultimately directed to a business representative 102 located at the business 120. As shown in FIG. 1, in certain embodiments the telephone number advertised by the business would be the one answered by the call center and a different telephone number could be used by the call center for forwarding the call to the business.

FIG. 2 illustrates a business center embodiment of the invention which uses the PSTN. In the sample configuration shown in FIG. 2, the call advertisement system 140 is located at the business 120, and not a call center 130, as shown in FIG. 1. The caller 100 makes a call to the business 120 through the PSTN 110. The call advertisement system 140, also connected to the PSTN 110, but located at the business 120, picks up the call using the switch 141 and directs the call to the answering terminal 140. The answering terminal, which in this embodiment is a computer with a processor, answering software, and a telephone communications interface, plays a third party advertisement to the caller 100 from the advertisement database 142. The answering terminal may be responsible for engaging the signal from the PSTN and from the switch such that an appropriately formatted advertisement, such as an audio advertisement, may be played from the caller who has called through the PSTN. For example, the signal from the PSTN and the signal sent from the answering terminal may include audio, text, video, or other data.

The advertisement database 142 in the embodiment shown in FIG. 2 is an electronic database. The advertisement database 142 is connected to the answering terminal 140 of the call advertisement system 140 at the business 120 through the Internet 112. In other embodiments, the advertisement database could connect to the answering terminal 140 via the PSTN 110, for example, by using a modem connected to the advertisement database 142 to call and connect to a modem at the answering terminal 143 (not shown). In yet further embodiments, advertisements from the advertisement database 142 could be mailed to the business 120 to be used in conjunction with the caller advertisement system 140 located at the business 120.

The advertisement database 142 according to FIG. 2 differs from the advertisement database 142 according to FIG. 1 only in that the advertisement database is connected to the caller advertisement system through the Internet 112 instead of the through a local connection. This feature allows a plurality of caller advertisement systems to be located at businesses remote to the advertisement database but still have access to the advertisement database, such as the business 120 featured in FIG. 2. The database includes all of the other features discussed above with respect to FIG. 1.

FIG. 3 illustrates a web server 144 embodiment of the invention which uses the Internet 112 instead of the PSTN. A caller 100 is connected to the Internet 112 using devices with internet capability, such as a computer, a VoIP phone, a cellular telephone or a personal digital assistant ("PDA"). The caller connects to the web server using any form of Internet addressing known in the prior art, such as a uniform resource locator ("URL"), internet protocol ("IP") address, instant messaging, or e-mail address, as well as software designed for use with the Internet 112, such as Internet Explorer or Mozilla Firefox. For example, a caller 100 browsing a web-page associated with a business 120 may choose to click on a link displayed on that web-page that begins a call by creating an audio connection over the Internet 112. The call first connects the caller 100 to caller advertisement system 140 web server 144. After the caller advertisement system 140 plays a third party advertisement to the caller 100 using the appropriate interface, the caller 100 is then connected to the web server 121 located at the business 120 via the Internet 112 since the business is connected to the Internet. Upon connecting to the business web server 121, the caller may be connected to a business representative 102 using well known VoIP technology.

The caller advertisement system 140 illustrated in the sample embodiment of FIG. 3 comprises a web server 144 which contains an advertisement database 142. The web server 144 is connected to the Internet and hosts appropriate software capable of connecting and answering a plurality of calls from callers through the Internet. The web server 144 shown also contains an advertisement database 142 which stores advertisements from third party advertisers. In other embodiments, the advertisement database 142 may be separate from the web server 144 and connected to it through appropriate data transferring means.

Similar to the system shown in FIGS. 1 and 2, a third party advertiser 130 may connect to the caller advertisement system 140 web server 144 via the Internet 112 as shown in FIG. 3. The advertisements database 142 is populated with advertisements from third party advertisers 130. A third party advertiser 130 may use the Internet 112 connection to populate the advertisement database 142 or to update the advertisement database 142.

Figure 4:
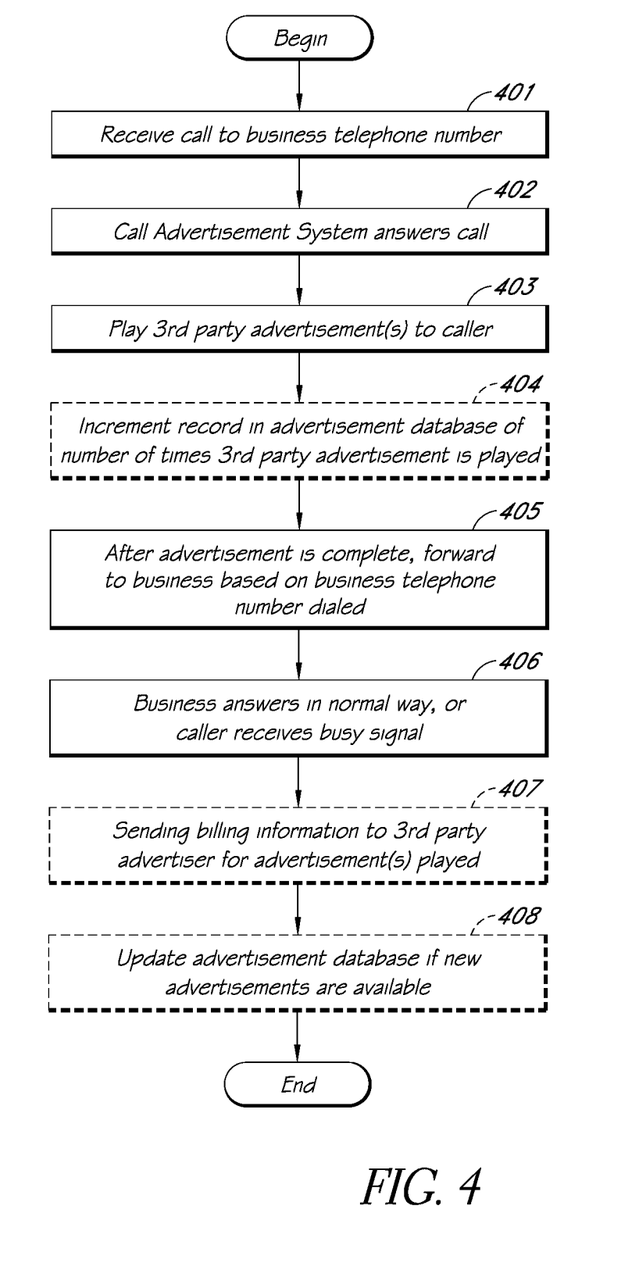
FIG. 4 illustrates an example flow chart for an embodiment of the call advertisement system where a call is answered by the business but not forwarded to the call center, or where the call center answers a call from a caller and then forwards the call to the business.

FIG. 4 illustrates an example flow chart for an embodiment of the call advertisement system where a call is answered by the business but not forwarded to the call center, or where the call center answers a call from a caller and then forwards the call to the business. The call advertising system associated with a business telephone number first receives a call from a caller 401 who has called that business telephone number. If the call advertisement system is located at a call center and not the business, then the business telephone number may have been an advertised telephone number for a business but actually is a number to the call center. The caller may thus not be aware that the telephone number he has dialed may have connected him to the call center and not the business. After the call advertisement system receives the call 401, it proceeds to answer the call from the caller 402. When the call is answered, the call advertisement system plays one or more third party advertisements to the caller 403. The third party advertisements may be retrieved from the advertisements database, as discussed above with reference to FIGS. 1-3. The next step is enclosed in a dotted line box because the system may be configured to complete the step as a matter of preference or as an option. Other preferential steps are also enclosed in a dotted line box in this Figure as well as FIG. 5. Returning to step 404, the call advertisement system may optionally increment a record of the number of times the third party advertisement that was played to the caller has been played overall. The system may also record what the caller's telephone number was, as well as any other information available on the advertisement playing event. These features would provide an enhanced ability to report to the third party advertiser information regarding how many times and to which callers the advertisement was played as well as help augment a caller profile.

After the call advertisement system completes playing the third party advertisement to the caller, the call advertisement system then forwards the caller to the appropriate business the caller was attempting to contact 405. If the call advertisement system is located at a call center, then the call advertisement system would determine the business to forward the caller to based on the business telephone number the caller originally dialed. For example, a call center may be reached by ten different telephone numbers, and each telephone number may be associated with a separate business, for a total of ten businesses. The call advertisement system would then forward the call to the appropriate business because the caller dialed a telephone number associated with that business to reach the call center. If the call advertisement system is located at the business, then the call advertisement system may forward the call to the telephone answering system that would have answered the call had the call advertisement system never answered the call. In step 406, the business may answer the call in a similar way to how it would have answered the call had the call advertisement system never answered the call. Alternatively, the caller may receive a busy signal if all lines to the business are busy. Next, the system may optionally be configured to send billing information to the third party advertiser for the advertisement that was played 407. This may be done every time an advertisement is played, after a certain number of times an advertisement is played, after a certain amount of time, or in any other configurable way. Furthermore, in step 408, if the advertisement database has access to the third party advertiser's advertisement database, then it may optionally update its database to reflect the latest advertisements of the third party advertiser. Access to the third party advertisement database may be provided in a number of ways, such as by proving an IP address to the call advertisement system or otherwise providing network access to the third party advertisement database.

Figure 5:
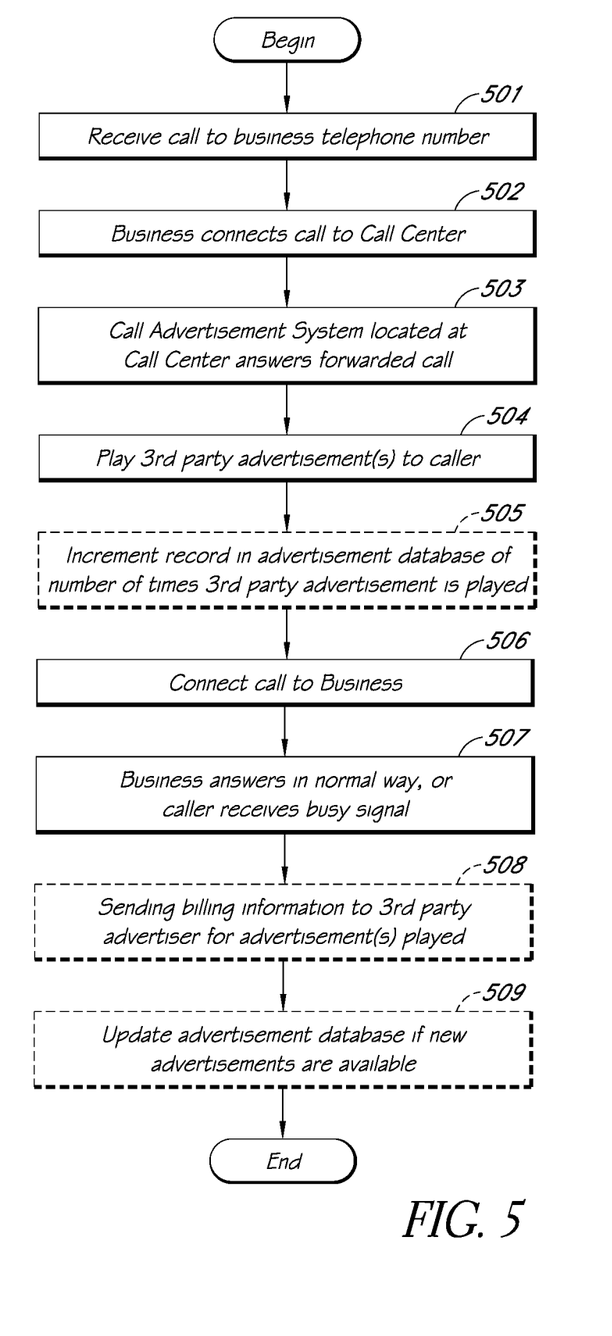
FIG. 5 illustrates an example flow chart for an embodiment of the call advertisement system where the caller first calls the business, is then forwarded by the business to the call center, and then the call center ultimately forwards the caller back to the business.

FIG. 5 illustrates an example flow chart for an embodiment of the call advertisement system where the caller first calls the business, is then forwarded by the business to the call center, and then the call center ultimately forwards the caller back to the business. The caller first calls a telephone number associated with a business 501. The business connects the call to the call center 502, where the call advertisement system is located. The call advertisement system then answers the call 503. Upon answering the call, the call advertisement system plays at least one third party advertisement to the caller 504. The advertisement played by the call advertisement may be of any length, including a ten second advertisement, a fifteen second advertisement, a thirty second advertisement, and so on. A brief ten second advertisement is suggested so as to maintain the caller's attention. In step 505, the call advertisement system may be configured to increment a record of the number of times the third party advertisement that was played to the caller has been played overall, as well as have any of the other features discussed above. After the call advertisement system completes playing the third party advertisement to the caller, the call advertisement system located at the call center then returns the caller to the business that originally forwarded the call to the call center 506. The business receives the call in step 507 and answers the call in a method similar to the way it would have answered the call had the call advertisement system never been involved. Alternatively, the caller may receive a busy signal if all lines to the business are busy. In steps 508 and 509, the system may be configured to send billing information to the third party advertiser for the advertisement played as well as update the advertisement database with new advertisements that are available, as discussed above with reference to steps 407 and 408 in FIG. 4.

Figure 6:
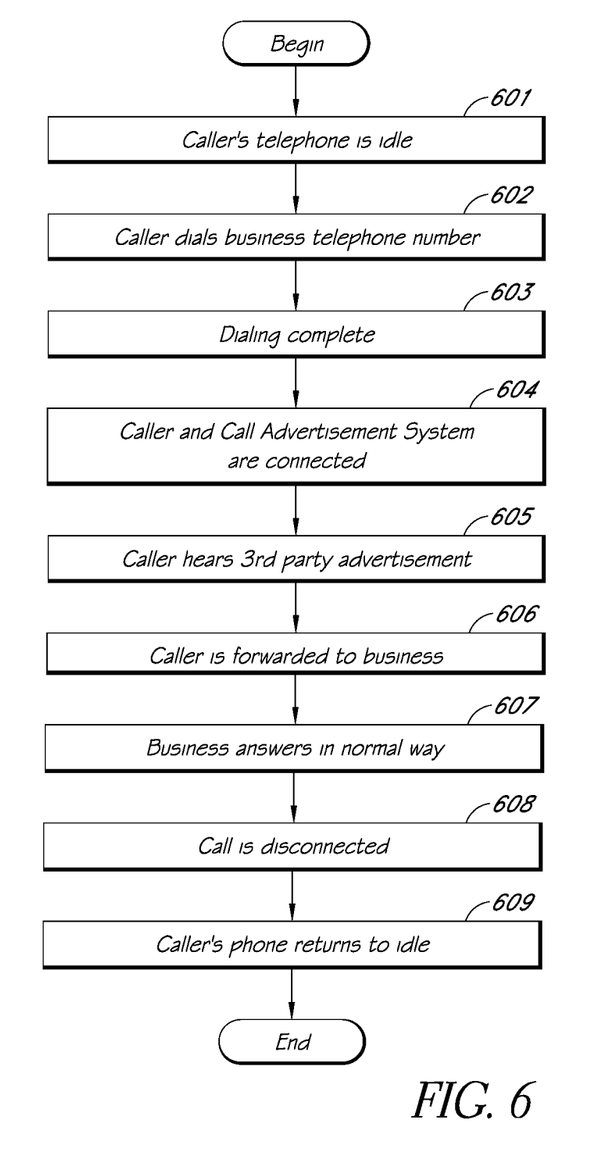
FIG. 6 illustrates a sample flow chart of what a typical caller to the call advertisement system would experience.

FIG. 6 illustrates a sample flow chart of what a typical caller to the call advertisement system would experience. A caller who is routed through the call advertisement system will typically not know if the call advertisement system playing her call is located at a call center; consequently, she should experience a similar process in most of the embodiments of the system and method described herein. A caller first picks up her idle telephone 601 to call a telephone number 602 associated with a business she intends to reach. After she completes dialing the telephone number 603, she is eventually connected to the call advertisement system 604, which then plays a third party advertisement for her 605. In certain embodiments, she may hear a message from the business she intends to call before hearing the third party advertisement. The message from the business may be played from either the call advertisement system or by the business itself. After listening to at least one third party advertisement, the caller is then forwarded to the business she originally intended to reach 606, for example, by an extension. The business then proceeds to answer the call from the caller in a normal way 607. After the caller finishes talking to the business, the call is disconnected 608 and the caller's phone returns to idle 609.

Figure 7:
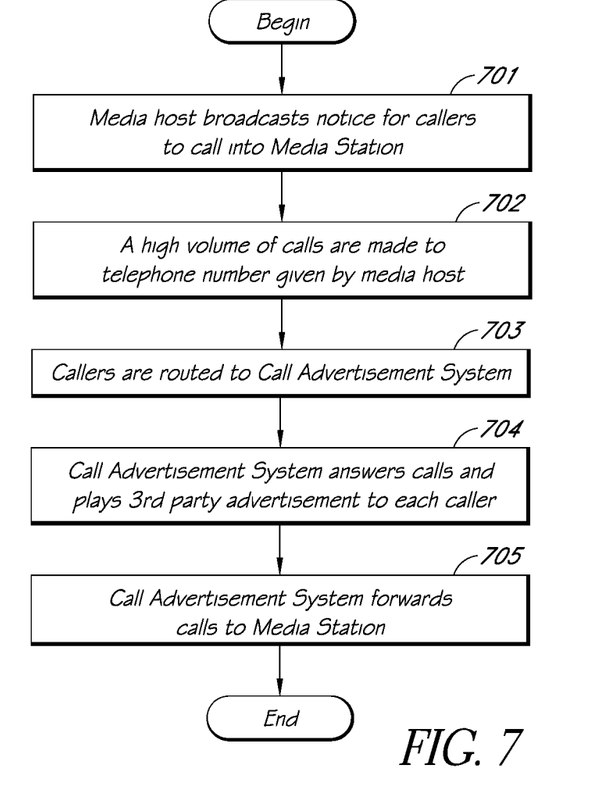
FIG. 7 illustrates a sample flow chart of how a business would use the call advertisement system.

FIG. 7 illustrates a sample flow chart of how a business would use the call advertisement system. The business used in the sample flow chart is a media station. A media station host would first broadcast notice for callers to call into the media station 701, such as a call-in contest. A high volume of calls would then proceed to be made to the telephone number broadcast by the media station in its notice 702. The callers would then be routed to the call advertisement system 703. The call advertisement system answers the calls from the callers and plays at least one third party advertisement to each caller 704. The call advertisement system then forwards each caller to the media station 705, where the call is answered in the normal fashion of the media station, or where the caller receives a busy signal.

Figure 8:
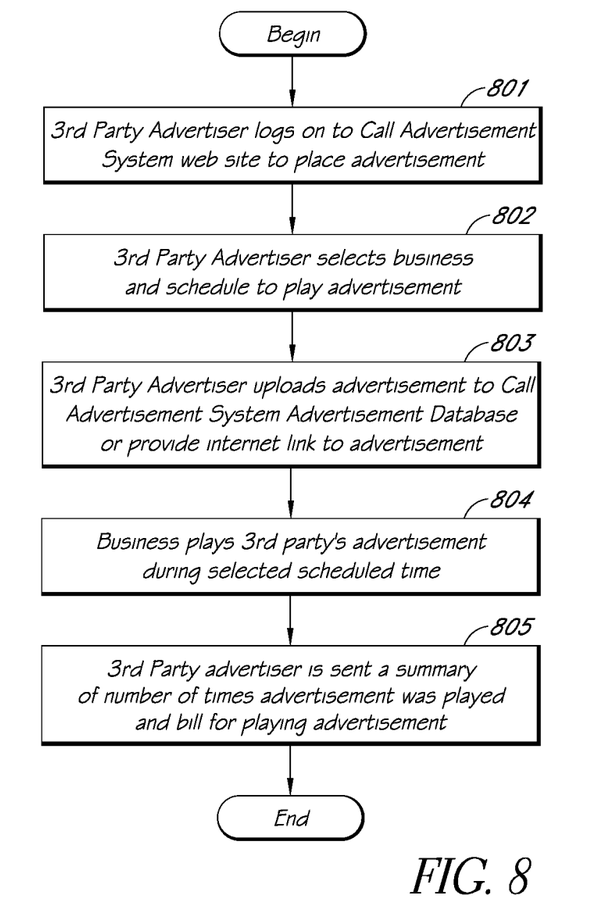
FIG. 8 illustrates an example flow chart of how a third party advertiser would use the call advertisement system.

FIG. 8 illustrates an example process of how a third party advertiser would use the call advertisement system to benefit the advertised product. For example, if a third party advertiser, a recording company, has just released a rock music album it may like to use the features of the call advertisement system to increase its sales. Consequently, the recording company would choose to use the call advertisement system described herein. According to the sample configuration shown in FIG. 1 and the sample flow chart of FIG. 8, in step 801 the recording company would first use the Internet 112 to log on to the advertisement database 142 which may advantageously be accessed through a web server. After connecting to the advertisement database 142, the recording company may select among businesses that are currently advertising on behalf of the call advertisement system to play the recording company's advertisement for the rock music album. For example, a radio music station that plays rock music may be one of the businesses available to play advertisements. The recording company may then select the rock music radio station to play the rock music album advertisement. The recording company may further choose what time the advertisement is played, how many times it is played, for how long it is played, if it is played in addition to other advertisements, or other similar features configurable in the call advertisement system. In an alternative embodiment, the advertiser may be presented with a list of call-in promotional contests a media station is running over the next few weeks and the advertiser may be permitted to select which of the call-in promotions it wants to play its advertisements. The media station could be for example a radio station, a web broadcast, or satellite radio. The third party advertiser then makes his advertisement available to the advertisement database associated with the call advertisement system by any of the methods known or discussed above 803, such as by uploading an audio file of the advertisement to the call advertisement system. The rock music radio station then plays the rock music album advertisement every time a call to the station is answered, such as during a high volume call-in contest as discussed above and shown in FIG. 7. In certain embodiments, the business, here the rock music radio station, may inform the caller that it has connected to the business before the third party advertisement is played. The third party advertiser is later sent a summary of the services provided by the call advertisement system 805 as discussed above, such as the number of times the advertisement was played or who the advertisement was played to. The summary may include a bill for the cost of providing the service, and may be charged in any format, such as a flat rate fee before the advertisement service begins playing such as a prepaid card like a calling card, a flat rate fee after the advertisement service begins playing, a charge by the number of times the advertisement was played, or a charge based on the length of the time slot the advertisement was scheduled to play in.

An example use of the system to create revenue for the call advertising system, to increase the audience of a third party advertisement, and to create funds for the businesses that play the third party advertisement, is now discussed. First, many businesses are constantly seeking opportunities to offset the costs of services they offer by finding a new source of income. For example, most radio stations are funded through the sale of airtime on the station to advertisers. Consequently, a radio station may further seek funding by finding a new opportunity to provide advertising space to advertisers. It is likely then that a radio station may advantageously use the call advertisement system in order to supplement its revenue Upon contacting the call advertisement system, the radio station would register to be a carrier of the call advertisement system's third party advertisements. The radio station would then arrange for the caller advertisement system to first answer calls made to the radio station's telephone number before the call is ultimately forwarded to the radio station, usually on an unpublished number. Additional examples of businesses that may seek out the call advertisement system are a reality television show that uses a viewing audience as an essential tool, such as a reality vocalist competition television show using caller voting, or a customer service telephone number, such as a computer technical support line.

While businesses seek to provide advertising space for the call advertisement system, third party advertisers, such as a movie studio, may seek to use that advertising space to place an advertisement, such as an advertisement for a new movie released by that movie studio. The studio will seek to promote the movie in order to increase attendance. Consequently, it will search for appropriate product placement for the advertisement as is advantageously done to increase sales. The studio may thus engage the call advertisement system as discussed herein because it provides an appropriate opportunity for product placement. The movie studio must first log on to the call advertisement system which in this example is available over the Internet. After accessing the call advertisement system, the movie studio can see which businesses have agreed to play third party advertisements on behalf of the call advertisement system. According to this example, the movie studio will find that a rock music radio station, a country western radio station, a reality vocalist competition television show using caller voting, and a computer technical support line are all available through the call advertisement system to play the movie studio's advertisement. The movie studio may advantageously select to play the new movie advertisement on calls to the rock music radio station and reality vocalist competition television show since the advertiser believes the callers to those two businesses would have the most interest in the movie. In certain embodiments, the caller advertisement system may provide a profile of callers to each business so as to better inform the third party advertiser as to which market each business has an appeal. The movie studio may further choose to be billed based on the number of times the advertisement is played on a certain day. The movie studio may then upload its advertisement to the call advertisement system's advertisement database, which will make the advertisement accessible to be played to each caller to the call advertisement system.

On the day selected by the movie studio to play the new movie advertisement, both the rock music radio station and reality vocalist competition television show may choose to hold a call-in contest. The rock music radio station may, for example, choose to reward the $10,000^{th}$ caller of the day with a vacation, and the reality vocalist competition television show may choose to crown a new top singer based on the number of votes current competing vocalists receive through call-in votes that day. The rock music radio station may publish the contest information by having a radio host announce the contest during broadcasting. If 15,000 people call into the rock music radio station and 24 million people call into the reality television show on that day, and all calls successfully went through the call advertisement system such that each caller heard the movie studio's advertisement and was then forwarded to either the rock music radio station or reality television show, then the advertisement was played to a caller 24,015,000 times that day. Furthermore, if the call advertisement system charged $0.10 each time the advertisement was played, then the call advertisement system created a revenue of $2,401,500 (24,015,000*0.10) for that day. If the businesses involved were given 10% of the revenue they generated, then the rock music radio station received $150 in funds and the reality television show received $240,000 in funds, leaving the call advertisement system with $2,161,350 in revenue.

Figure 9:
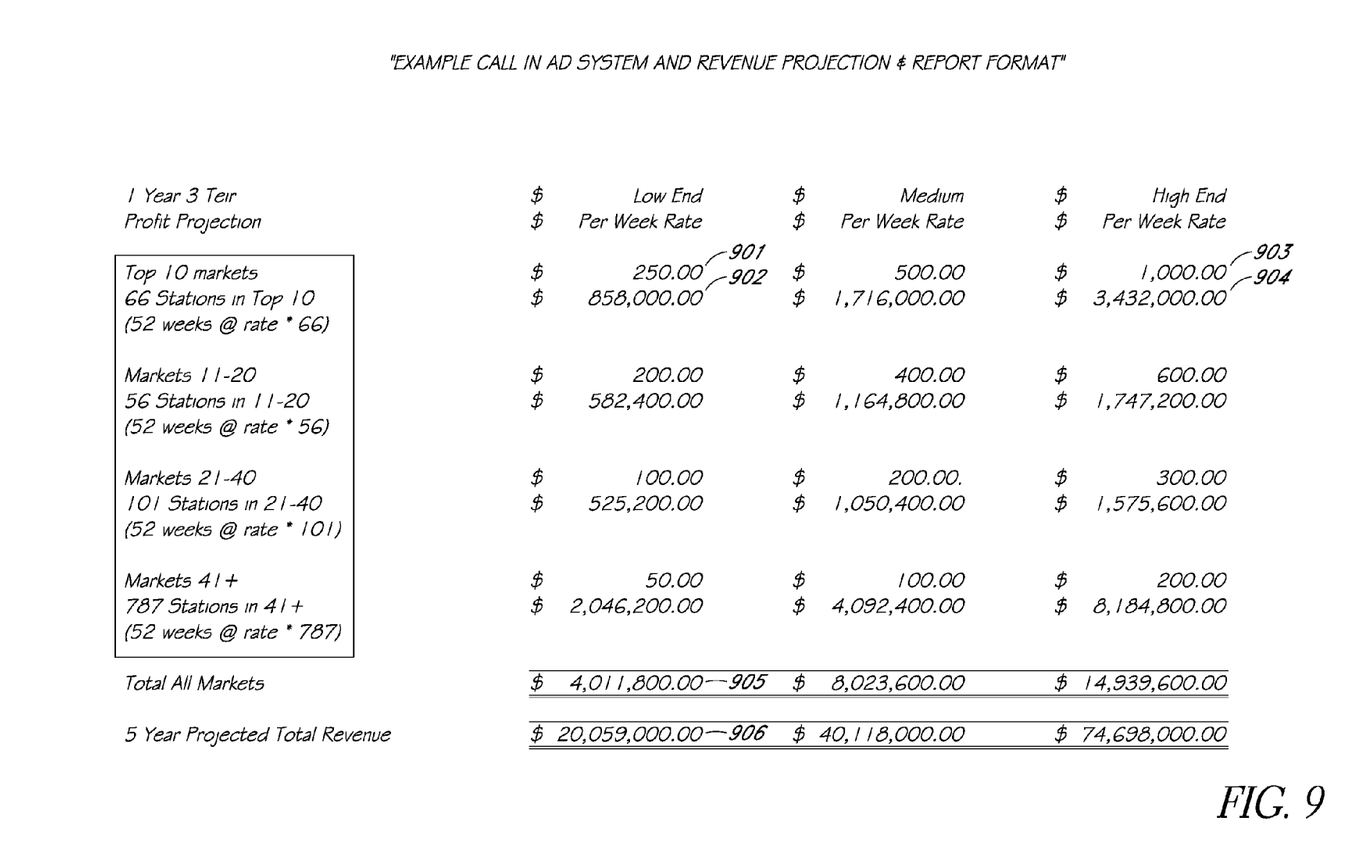
FIG. 9 illustrates an example of a revenue projection using a media company which owns several radio stations across different markets as an example business and showing how the markets may be advantageously segmented and current reports generated.

FIG. 9 illustrates an example of a revenue projection using a media company which owns several radio stations across different markets as an example business and showing how the markets may be advantageously segmented. One form of segmentation may be by the number of listeners within a certain geographical area. Another form of segmentation could be by the type of programming offered by the radio stations. The example revenue projection figure may be used for a media station or media company that uses the call advertisement system to prepare a report on revenue gained from playing third party advertisements. The sample figure uses an example where the business has charged a flat rate weekly fee to third party advertisers to play their advertisements. Under a flat rate weekly fee, a third party advertiser can play one or several selected advertisements for every caller to the call advertisement system for a period of a week. A limit may also be set for the number of times advertisements may be played for the third party advertiser. Alternatively, selected time in a flat rate weekly fee may be divided between several advertisers, so, for example, thirty percent of the week may be devoted to advertisements from one advertiser and seventy percent of the week may be devoted to advertisers from a second advertiser. The first advertiser may pay thirty percent of the weekly rate and the second advertiser may pay seventy percent of the weekly rate. Returning to sample FIG. 9, if the media company charges a low end weekly rate to play third party advertisements in its top ten markets, such as two hundred and fifty dollars 901, and the media company has sixty six stations in those top ten markets, then the media company may generate $858,000 in revenue 902. Alternatively, if the media company charges a high end weekly rate, such as one thousand dollars 903, then it may make $3,432,000 in revenue 904. According to the example, if the media company charges a low end weekly rate to play third party advertisements in all of its markets, then it may make $4,011,800 in revenue 905 in one year, and $20,059,000 in revenue for five years 906 by playing the third party advertisements according to the call advertisement system.

The sample revenue projection report could be readily adapted for use in combination with computer software and the data collected by the advertisement database (such as how many times an advertisement was played, when it was played, and so on) to provide instant feedback. For example, the system may create alternative reports, such as daily reports or weekly reports. Additionally, using the data collected by the advertisement database, the media company could determine which of its hosts generated the most revenue for the system by examining data on the number of calls to the system during certain time periods, and correlating that data to the hosts that were on during that time. As a result, media hosts who generate more revenue could be noted.

The features disclosed herein may be advantageously used in the context of supplying advertisements to callers without the use of delay call forwarding.

It will be appreciated by those skilled in the art that the above-described system may be straightforwardly adapted or extended in various ways. While the foregoing description makes reference to particular embodiments, the scope of the invention is defined solely by the claims that follow and the elements recited therein.

What is claimed is:

1. A system to provide advertising responsive to a large number of generally contemporaneous communications received by the system, the system comprising:
   a broadcast provided through a system capable of reaching a large number of individuals at about the same time;
   a responsive communication receiving system configured to provide an advertisement message to individuals who have responded to the broadcast;
   a notice distributed as part of the broadcast, which results in a high volume of generally contemporaneous responsive communications from individuals to the communication receiving system;
   a plurality of advertisers' messages stored in memory and accessible by said communication receiving system,
   wherein the responsive communication receiving system provides at least one of the plurality of advertisers' messages to at least a portion of the individuals who have responded and is configured to further respond to the received communications in accordance with the nature of the individual responsive communication.

2. The system according to claim 1, where the volume of generally contemporaneous communications is at least ten.

3. The system according to claim 1, where the volume of generally contemporaneous communications is at least one hundred.

4. The system according to claim 1, where the volume of generally contemporaneous communications is at least one thousand.

5. The system according to claim 1, where the volume of generally contemporaneous communications is at least ten thousand.

* * * * *